(12) United States Patent
Vetters

(10) Patent No.: US 8,438,859 B2
(45) Date of Patent: May 14, 2013

(54) INTEGRATED BYPASS ENGINE STRUCTURE

(75) Inventor: Daniel Kent Vetters, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 1320 days.

(21) Appl. No.: 12/006,980

(22) Filed: Jan. 8, 2008

(65) Prior Publication Data

US 2009/0175716 A1 Jul. 9, 2009

(51) Int. Cl.
*F02C 7/20* (2006.01)

(52) U.S. Cl.
USPC ............................................ 60/798; 60/226.1

(58) Field of Classification Search .................. 60/226.1, 60/796–798, 262; 415/144, 201; 244/54, 244/53 R; 248/554–557
See application file for complete search history.

(56) References Cited

U.S. PATENT DOCUMENTS

| | | | | |
|---|---|---|---|---|
| 2,529,958 A | * | 11/1950 | Henstridge et al. | 60/797 |
| 4,013,246 A | * | 3/1977 | Nightingale | 244/54 |
| 4,037,809 A | * | 7/1977 | Legrand | 244/54 |
| 4,043,522 A | * | 8/1977 | Vetter | 244/54 |
| 4,132,069 A | | 1/1979 | Adamson et al. | |
| 4,603,821 A | * | 8/1986 | White | 244/54 |
| 4,825,648 A | * | 5/1989 | Adamson | 60/226.1 |
| 4,920,744 A | * | 5/1990 | Garcia et al. | 60/226.1 |
| 5,452,575 A | * | 9/1995 | Freid | 60/797 |
| 6,227,485 B1 | * | 5/2001 | Porte | 244/54 |
| 6,606,854 B1 | | 8/2003 | Siefker et al. | |
| 7,124,981 B2 | | 10/2006 | Parham | |
| 7,938,359 B2 | * | 5/2011 | Guibert et al. | 244/54 |
| 8,136,362 B2 | * | 3/2012 | Beutin et al. | 60/796 |
| 2002/0194834 A1 | | 12/2002 | Springer | |
| 2005/0150204 A1 | | 7/2005 | Stretton et al. | |
| 2006/0038066 A1 | * | 2/2006 | Udall et al. | 244/54 |
| 2006/0101804 A1 | | 5/2006 | Stretton | |
| 2006/0108807 A1 | | 5/2006 | Bouiller et al. | |
| 2006/0137355 A1 | | 6/2006 | Welch et al. | |
| 2008/0317588 A1 | * | 12/2008 | Grabowski et al. | 415/174.1 |
| 2009/0000308 A1 | * | 1/2009 | Cloft et al. | 60/802 |

FOREIGN PATENT DOCUMENTS

EP 1 627 812 A2 2/2006

* cited by examiner

*Primary Examiner* — Phutthiwat Wongwian
(74) *Attorney, Agent, or Firm* — Krieg DeVault LLP

(57) ABSTRACT

One form of the present invention contemplates an apparatus including a gas turbine engine core, wherein a gearbox accessory is mounted to the engine core and is substantially enclosed by an inner fairing. The apparatus can further include a nacelle having a plurality of panels, wherein the nacelle panels substantially enclose and overlap at least a portion of the inner fairing. The apparatus can further include a bypass duct defined between an exterior surface of the inner fairing and an interior surface of at least some of the nacelle panels. In additional and/or alternative forms a number of frame rods can also be used internal to the nacelle or nacelle panel. In some forms the frame rods can be connected between a front and rear frame.

18 Claims, 4 Drawing Sheets

INTEGRATED BYPASS ENGINE STRUCTURE

BACKGROUND

The present inventions relate generally to airflow bypass in gas turbine engines, particularly turbofan engines and more particularly, but not exclusively, to airflow bypass in a turbofan engine having a core mounted accessory. Although, the present inventions were developed for use in turbofan engines, certain applications may be outside this field.

Presently many systems for bypassing airflow suffer from a number of disadvantages, limitations, and drawbacks including, for example, those respecting manufacturing cost, assembly time, and service access to the engine core. Thus, there is a continuing need for the development of technology for bypassing airflow within a gas turbine engine. The present inventions satisfy this need in a novel and unobvious way.

SUMMARY

One embodiment of the present invention is an apparatus comprising a gas turbine engine core. A gearbox accessory is mounted on the engine core, which is substantially enclosed by an inner fairing. The apparatus further includes a nacelle having a plurality of panels. The nacelle panels substantially enclose and overlap at least a portion of the inner fairing. A bypass duct is defined between an exterior surface of the inner fairing and an interior surface of at least some of the nacelle panels.

In one refinement of the embodiment the inner fairing includes a plurality of local access panels.

In another refinement of the embodiment the gearbox accessory is a starter/generator that has a diameter greater than five inches.

In another refinement of the embodiment the engine core comprises a plurality of frame rods. Each rod has a front end connected to a front frame and a rear end connected to a rear frame. The nacelle panels enclose the frame rods.

In another refinement of the embodiment at least two of the frame rods are arranged to define a triangular shaped space. At least one of the local access panels possesses a size and shape substantially the same as the triangular shaped space defined by said at least two of the frame rods.

In another refinement of the embodiment the nacelle panels extend between the front frame and the rear frame. The ends of the rods are connected to the respective frames by pins.

In another refinement of the embodiment at least one of the local access panels can be unfastened and substantially circumferentially rotated to permit service access to the engine core.

In another refinement of the embodiment additional components are mounted to the engine core and substantially enclosed by the inner fairing.

Another embodiment of the present invention comprises a gas turbine engine core with an accessory mounted to the engine core. The accessory is positioned within an inner fairing, and is further positioned at least partially between a front frame and a rear frame. The frames are outboard of the inner fairing. The engine core further includes a plurality of frame rods, each rod having a front end connected to the front frame and a rear end connected to the rear frame. The engine core also comprises a nacelle outboard of the plurality of frame rods and a bypass duct defined by the inner fairing and the nacelle.

In one refinement of the embodiment the accessory is a gearbox accessory and has a diameter greater than five inches.

In another refinement of the embodiment the inner fairing includes a plurality of local access panels.

In another refinement of the embodiment at least two of the frame rods are connected to the frames to define a triangular shaped space between two frame rods.

In another refinement of the embodiment at least one of the local access panels is removable and possesses a size and shape that is substantially the same as the triangular shaped space defined by said at least two of the frame rods.

In another refinement of the embodiment the nacelle includes a plurality of nacelle panels, and at least one of the local access panels of the inner fairing can be unfastened and rotated to access the engine core.

In another refinement of the embodiment the nacelle includes a plurality of nacelle panels, in which at least one of the nacelle panels is movable, and at least one of the local access panels is movable.

In another refinement of the embodiment the gearbox accessory includes a starter/generator having a diameter greater than five inches, and at least one of the local access panels is removable.

In another embodiment of the present invention, a gas turbine engine comprises an engine core. The engine includes a bypass duct radially outward of the core, the bypass duct defined between an inner fairing and a nacelle. The inner fairing comprises a plurality of inner fairing panels. The nacelle comprises a plurality of nacelle panels. At least one of the nacelle panels and one of the inner fairing panels are movable and configured to provide service access to the engine core. The engine core further includes a plurality of frame rods. Each frame rod has a front end connected to a front frame and a rear end connected to a rear frame. The nacelle panels are outboard of the frame rods.

In one refinement of the embodiment, a gearbox accessory is mounted to the engine core, and at least one of the inner fairing panels is movable.

In another refinement of the embodiment, at least two of the frame rods are connected to the frames to define a triangular shaped space between two rods. At least one of the inner fairing panels is removable and possesses a size and shape that is substantially the same as the triangular shaped space defined by said at least two of the frame rods.

In another refinement of the embodiment, the gearbox accessory is a starter/generator that has a diameter greater than five inches.

Other forms of the present invention contemplate unique apparatuses, systems, devices, hardware, methods, and combinations of these for bypassing air flow and providing service access. Further embodiments, forms, objects, features and aspects of the present inventions shall become apparent from the following description and drawings.

DESCRIPTION OF THE ILLUSTRATIVE EMBODIMENTS

Figure 1:
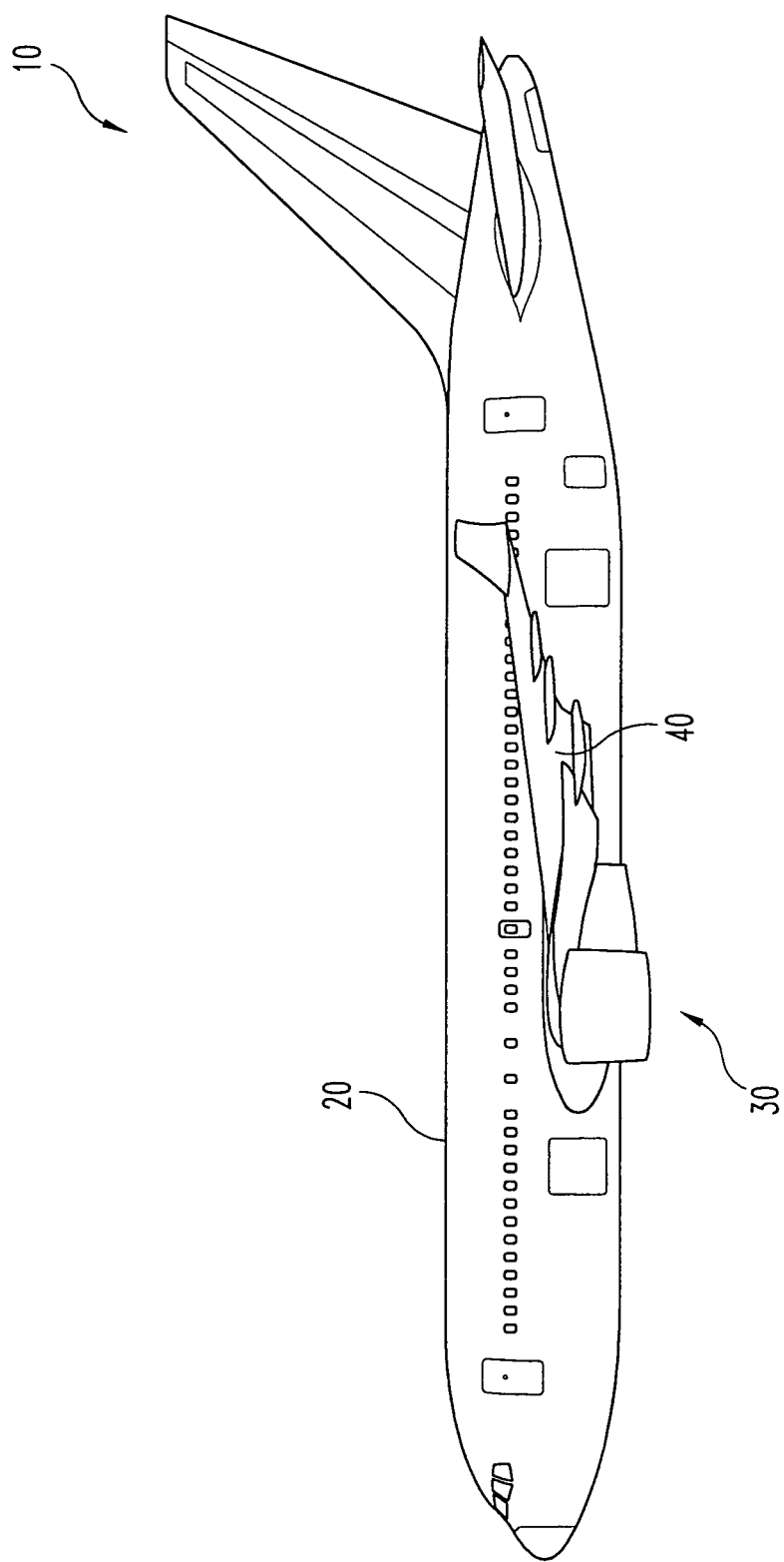
FIG. 1 is a side view of an aircraft including one embodiment of the present application.

For the purposes of promoting an understanding of the principles of the inventions, reference will now be made to the embodiment illustrated in the drawings and specific language will be used to describe the same. It will nevertheless be understood that no limitation of the scope of the inventions is thereby intended, such alterations and further modifications in the illustrated device, and such further applications of the principles of the invention as illustrated therein being contemplated as would normally occur to one skilled in the art to which the invention relates.

With reference to FIG. 1, there is illustrated a non-limiting view of an aircraft 10. Aircraft 10 includes a fuselage 20 and an aircraft flight propulsion engine 30 mounted to a wing 40. Aircraft flight propulsion engine 30 is mounted to wing 40 in a conventional manner known to those of ordinary skill in the art. The term aircraft is generic and includes, but is not limited to, helicopters, airplanes, missiles, unmanned space devices and any other substantially similar devices.

Figure 2:
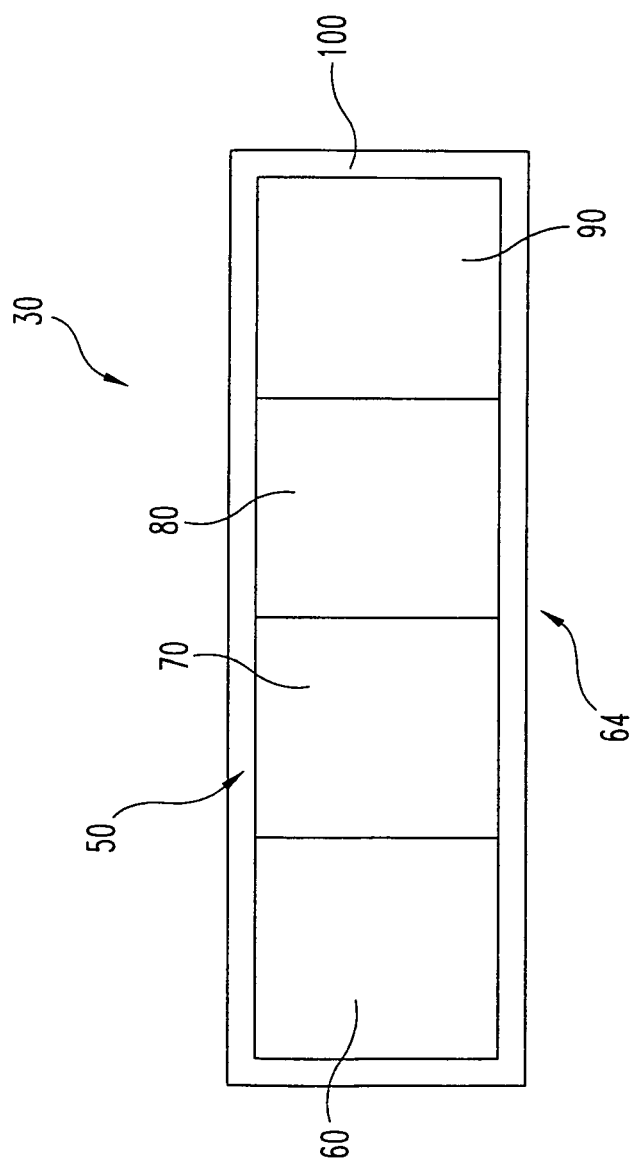
FIG. 2 is an illustrative schematic view of a gas turbine engine.

Referring to FIG. 2, there is illustrated a schematic representation of a gas turbine engine 50, which includes a fan section 60 and an engine core 64. Engine core 64 includes a compressor section 70, a combustor section 80, and a turbine section 90 that are located within a nacelle or case 100 to provide aircraft flight propulsion engine 30. This type of gas turbine engine is generally referred to as a turbofan. A person of ordinary skill in the art will recognize that there are multitudes of ways in which the gas turbine engine components can be linked together. The present invention is applicable to all types of gas turbine engines, in particular turbofans, and is not intended to be limited herein to an engine similar to that shown in the schematic of FIG. 2 unless specifically provided to the contrary.

Figure 3:
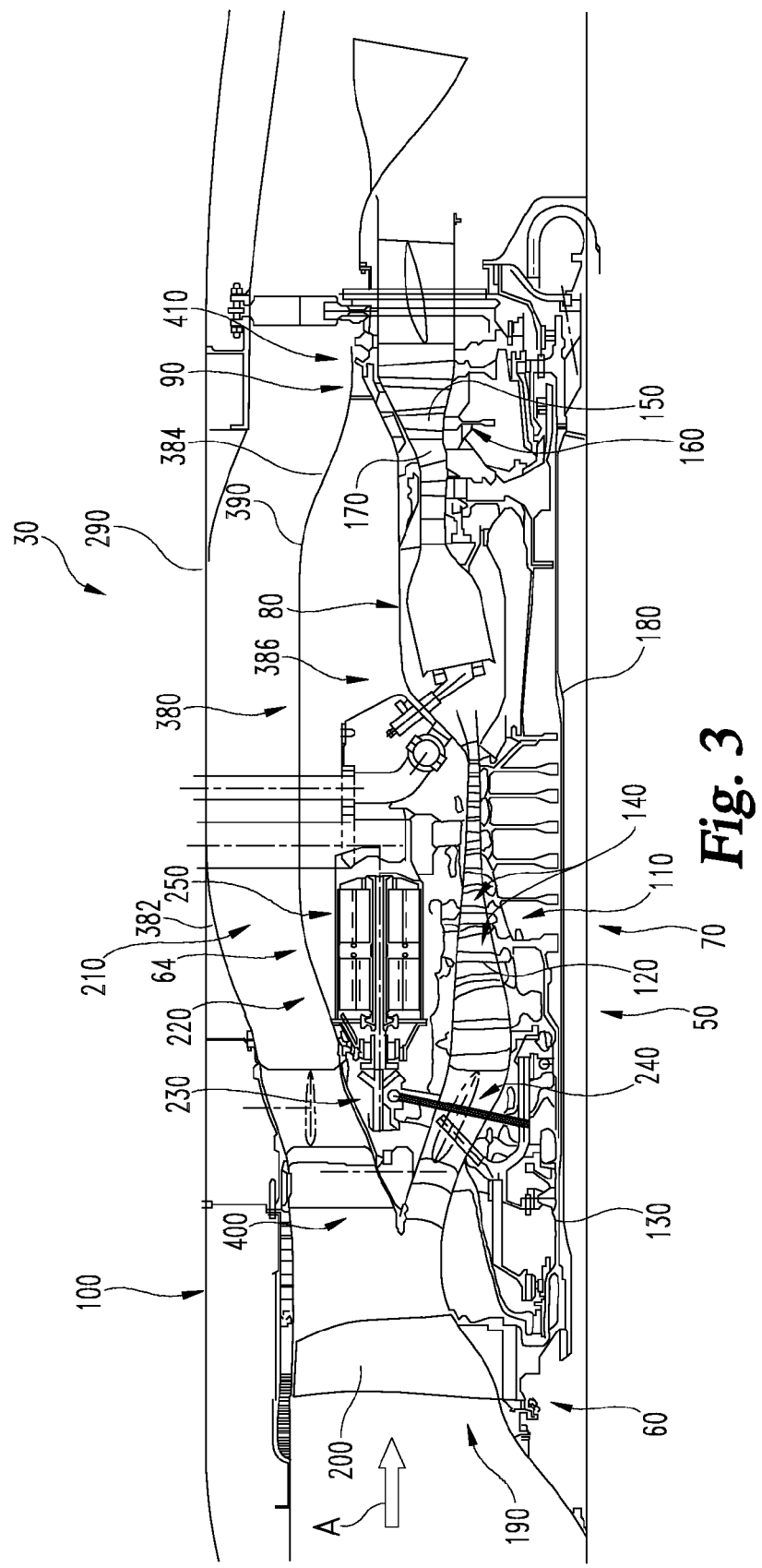
FIG. 3 is a partial cross-sectional view of the gas turbine engine system shown in FIG. 1.

With reference to FIG. 3, there is illustrated a non-limiting partial cross-sectional view of gas turbine engine 50. Compressor section 70 includes a rotor 110 having a plurality of compressor blades 120 coupled thereto. The compressor may have one or a plurality of stages that are spaced in an axial arrangement. Rotor 110 is affixed to a shaft 130 that is rotatable within gas turbine engine 50. A plurality of compressor vanes 140 are preferably positioned within compressor section 70 to direct the fluid flow relative to compressor blades 120. Turbine section 90 includes a plurality of turbine blades 150 coupled to a rotor disk 160. The turbine section 90 may include one or more stages. Rotor disk 160 is affixed to shaft 130, which is rotatable within gas turbine engine 50. Energy extracted in turbine section 90 from hot gas exiting combustor section 80 is transmitted through shaft 130 to drive compressor section 70. Further, a plurality of turbine vanes 170 are preferably positioned within turbine section 90 to direct the hot gaseous flow stream exiting combustor section 80.

Turbine section 90 also provides power to a fan shaft 180, which drives fan section 60. Fan section 60 includes a fan 190 having a plurality of fan blades 200 extending therefrom. Air enters gas turbine engine 50 in the general direction of arrow A and passes through fan section 60 into compressor section 70 and a bypass duct 210 formed around engine core 64.

In one form of the present application, gas turbine engine 50 further includes at least one core mounted accessory unit 220. In one form accessory unit 220 includes a gear box 230 having an accessory shaft 240 connected to at least one of shaft 130 or fan shaft 180 to receive power from turbine section 90 which in turn drives at least one accessory 250. The term accessory is intended to broadly represent any accessory including, but not limited to, a starter, a generator, a starter/generator, an oil pump, bleeds, or variable actuation systems. Another form of the present application contemplates a pair of gear boxes 230 preferably positioned within engine core 64 approximately 180° apart. Other forms contemplate the pair of gear boxes positioned greater or less than 180° apart. Still other forms contemplate more than two gear boxes being utilized. One form of the present application contemplates a plurality of accessory units 220 being utilized. While accessory unit 220 is shown in a core mounted arrangement in FIG. 3, the present application further contemplates that gear box 230 and/or accessories 250 might be mounted exterior to engine core 64 such as in a traditional case mounted manner.

Figure 4:
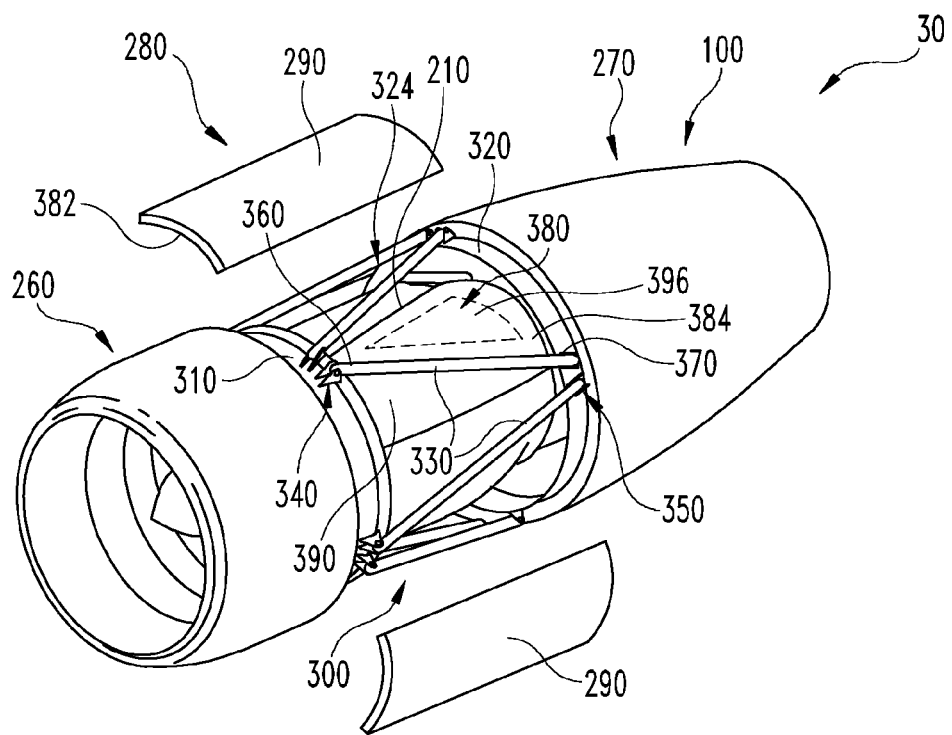
FIG. 4 is a partially exploded view of the gas turbine engine system shown in FIG. 1.

With reference to FIG. 4, there is illustrated a non-limiting partially exploded perspective view of flight propulsion engine 30. In one form of the present application, nacelle 100 includes a fore nacelle portion 260, an aft nacelle portion 270, and a central nacelle portion 280 positioned between fore and aft nacelle portions 260, 270. Central nacelle portion 280 preferably includes a pair of movable nacelle panels 290. However, the present application contemplates other numbers of nacelle panels. The term movable, as used herein, is intended to broadly encompass any component that might be displaced and not permanently fixed in one place, position, or posture. In one form of the present invention the nacelle panels might be rotatable. In another form of the present invention the nacelle panels might be removable. Removable components are considered to be movable, but movable components are not necessarily removable. The present application contemplates that the nacelle panels 290 may be moveable or removable components. One form contemplates central nacelle portion 280 including more than one nacelle panel, at least one of which is movable. Still other forms contemplate multiple movable nacelle panels. Additionally, it is understood that nacelle panel 290 might be a door or hatch that may be rotatably or otherwise opened via a hinge or other mechanism known to those of ordinary skill in the art. Still further, nacelle panels 290 could also be removable or capable of being detached and/or separated from the remainder of nacelle 100.

Positioned radially inward of nacelle panels 290 is an engine support frame structure 300. In one embodiment a plurality of fasteners (not shown) couple nacelle panels 290 to frame structure 300. Engine support frame structure 300 includes a fore frame 310, an aft frame 320, and a plurality of carrying members 324. In one form, the plurality of carrying members 324 each include at least one space frame rod 330 extending between fore frame 310 and aft frame 320 structurally tying fore frame 310 to aft frame 320 to carry engine loads. Carrying members 324 each preferably include a fore mount 340 attached to fore frame 310 and an aft mount 350 attached to aft frame 320. As shown in FIG. 4, each frame rod 330 includes a fore end 360 and an aft end 370. Fore end 360 is received within fore mount 340 and aft end 370 is received within aft mount 350. In one embodiment of the present invention fore end 360 and aft end 370 are preferably pinned within respective fore mount 340 and aft mount 350.

As further shown in FIG. 4, frame rods 330 are disposed in a triangular arrangement to provide structural support to gas turbine engine 50. Other forms of the present application contemplate a variety of arrangement geometries and any number of frame rods 330 being utilized to structurally support gas turbine engine 50. Additionally, while frame rods 330 are shown as substantially cylindrical rods in FIG. 4, other shapes, sizes and thickness are contemplated such as square or another polygonal shape. Still further, frame rods 330 also may be either hollow or solid.

Referring to FIGS. 3 and 4, bypass duct 210 is preferably defined between central nacelle portion 280 and an inner fairing 380. At least a portion of an interior surface 382 of nacelle panel 290 and an exterior surface 384 of inner fairing 380 define bypass duct 210. Inner fairing 380 is positioned radially outward from engine core 64 forming an interior space 386 between inner fairing 380 and engine core 64. Interior space 386 is preferably sized to accommodate accessory 250 in the form of a starter/generator. Other forms contemplate multiple accessories being utilized. As shown in FIG. 3, interior space 386 preferably provides space for larger sized accessories (not shown) such as a starter/generator. In one form the accessory can have a diameter greater than about five (5) inches. However, no limitation on the size of the accessory/components is contemplated herein unless specifically provided to the contrary.

Inner fairing 380 preferably includes at least one fairing panel 390 movably encompassing engine core 64. In one form the at least one fairing panel 390 is movably connected to engine core 64 preferably with a plurality of fasteners (not shown). One form of the present application contemplates inner fairing 380 extending from a first end 400 of engine core 64 near the entrance to compressor section 70 to a second end 410 of engine core 64 near the exit of turbine section 90 thereby preferably defining a full inner fairing. A full inner fairing aids in optimizing bypass performance by maintaining desired bypass flow velocities and uniform mach numbers. Other forms contemplate inner fairing 380 extending a length less than the full fairing. As shown in FIG. 4, frame rods 330 are positioned within bypass duct 210 with sufficient space between each rod 330 such that bypass flow is at most only minimally affected, while still providing service access to core mounted components. Defining bypass duct 210 between interior surface 382 and exterior surface 384 outboard of frame rods 330 reduces the number of layers or panels which must be removed to reach engine core 64. Bypass duct 210 is also moved outboard from its typical location providing additional space for core mounted accessories. The reduction of layers and moving bypass duct 210 outboard is accomplished by eliminating the typical structural bypass duct that limited the size and location of access ports.

Figure 5:
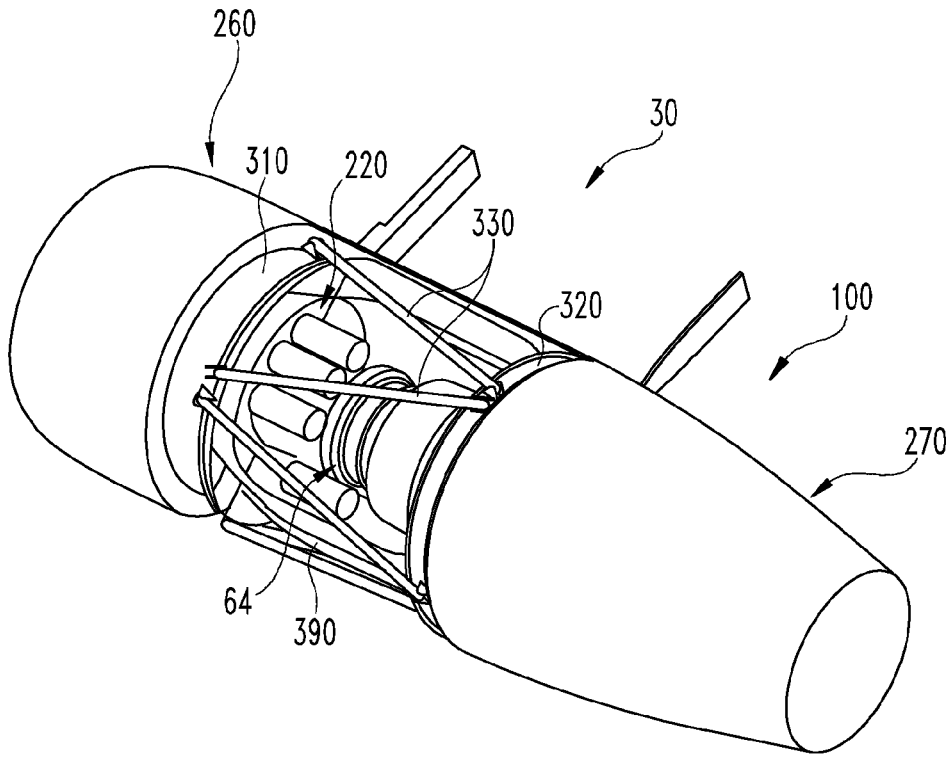
FIG. 5 is a perspective view showing the gas turbine engine system of FIG. 1 with an outer nacelle panel and an inner fairing panel removed.

With reference to FIG. 5, there is illustrated a non-limiting partially exploded perspective view of flight propulsion engine 30 with one fairing panel 390 unfastened and moved to uncover engine core 64. Fairing panel 390 is preferably provided as a local access panel and is shown unfastened and rotated out of the way to provide service access to engine core 64 and/or accessory unit 220. To provide further access, at least one form of the present application contemplates that nacelle panels 290 extend across at a length great enough to provide access to service fore and aft sumps (not shown).

As shown in FIG. 4, inner fairing 380 may optionally include at least one local access panel 396, shown with dashed lines, to provide access to engine core 64 and accessory unit 220 in lieu of or in combination with fairing panel 390. Access panels 396 preferably have a size and shape substantially the same as the triangular spaces defined between rods 330 to facilitate removal of access panels 396 without having to remove any rods 330. It is contemplated as within the scope of the present invention that faring panels 390 may be sized and shaped similar to the above described local access panel 396 to provide access either by unfastening and rotating out the way or by removal through the triangular spaces defined between rods 330. However, the present application further contemplates that the faring panels may have other sizes and shapes and are not limited to a triangular shape.

The present application contemplates a unique method of performing service to the core 64 and/or accessory unit 220. In one non-limiting example, service begins by moving or removing at least one nacelle panel 290. After moving or removing nacelle panel 290, fasteners (not shown) are removed from at least one fairing panel 390. Fairing panel 390 is next preferably rotated circumferentially to a position underneath engine core 64 or otherwise moved out of the way to provide access to engine core 64. The access is provided to engine core 64 and accessory unit 220 where the desired maintenance/repair operation may be performed, preferably without requiring removal of frame rods 330. Another form of the present application contemplates one or more of frame rods 330 being removed to provide additional access when desired and/or if necessary to remove fairing panels 390 (that might not possess the triangular shape necessary to fit between the frame rods 330). As discussed above, however, faring panels 390 may be roughly the size and shape of the space between frame rods 330 and thus be removed through the space defined by respective frame rods 330 to provide access to engine core 64. Another form of the present application contemplates local access panels 396 being provided that are removable through the spaces provide by respective frame rods 330 in lieu of or in addition to fairing panels 390. Other forms contemplate the steps being performed in a different order and/or additional maintenance steps than those described being performed.

As should be appreciated from the above description, while the fan section, turbine section, and compressor section were each described as each having only a single section, other forms contemplate that there may be multiple fan sections, turbine sections, and/or compressor sections. Additionally, further engine components then those described above, such as nozzles, may be added.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a gas turbine engine core;
a gearbox accessory mounted to the engine core and substantially enclosed by an inner fairing, wherein the inner fairing includes a panel and a local access panel configured to be removable from the panel, the panel and the local access panel having different shapes;
a nacelle having a plurality of panels, wherein the nacelle panels substantially enclose and overlap at least a portion of the inner fairing; and a bypass duct defined between an exterior surface of the inner fairing and an interior surface of at least some of the nacelle panels.

2. The apparatus of claim 1, wherein the inner fairing includes a plurality of local access panels.

3. The apparatus of claim 1, wherein the gearbox accessory is a starter/generator that has a diameter greater than five inches.

4. The apparatus of claim 1, further comprising a plurality of frame rods, each rod having a front end connected to a front frame and a rear end connected to a rear frame, wherein the nacelle panels enclose the frame rods.

5. The apparatus of claim 4, wherein at least two of the frame rods are arranged to define a triangular shaped space, and wherein the local access panel possesses a size and shape that is substantially the same as a triangular shaped space defined by said at least two of the frame rods.

6. The apparatus of claim 4, wherein the nacelle panels extend between the front frame and the rear frame, and wherein the ends of the rods are connected to the respective frames by pins.

7. The apparatus of claim 4, wherein the a local access panel can be unfastened and substantially circumferentially rotated to permit service access to the engine core, and which further includes a plurality of local access panels.

8. An apparatus comprising:
a gas turbine engine core;
an accessory mounted to the engine core, the accessory being positioned within an inner fairing, the accessory further being positioned at least partially between a front frame and a rear frame, wherein the frames are outboard of the inner fairing;
a plurality of frame rods, each rod having a front end connected to the front frame and a rear end connected to the rear frame;
a nacelle outboard of the plurality of frame rods;
a bypass duct defined by the inner fairing and the nacelle;
wherein at least two of the frame rods are connected to the frames to define a triangular shaped space between two frame rods; and
wherein at least one local access panel is removable and possesses a size and shape that is substantially the same as the triangular shaped space defined by said at least two of the frame rods.

9. The apparatus of claim 8, wherein the accessory is a gearbox accessory and has a diameter greater than five inches.

10. The apparatus of claim 8, wherein the inner fairing includes a plurality of local access panels.

11. The apparatus of claim 10, wherein the nacelle includes a plurality of nacelle panels, and wherein at least one of the local access panels of the inner fairing can be unfastened and rotated to access the engine core.

12. The apparatus of claim 10, wherein the nacelle includes a plurality of nacelle panels, wherein at least one of the nacelle panels is movable, and wherein at least one of the local access panels is movable.

13. The apparatus of claim 12, wherein the gearbox accessory includes a starter/generator having a diameter greater than five inches, and wherein said at least one of the local access panels is removable.

14. An apparatus comprising:
a gas turbine engine core;
a gearbox accessory mounted to the engine core and substantially enclosed by an inner fairing;
a nacelle having a plurality of panels, wherein the nacelle panels substantially enclose and overlap at least a portion of the inner fairing;
a bypass duct defined between an exterior surface of the inner fairing and an interior surface of at least some of the nacelle panels;
a plurality of frame rods, each rod having a front end connected to a front frame and a rear end connected to a rear frame, wherein the nacelle panels enclose the frame rods; and
wherein at least two of the frame rods are arranged to define a triangular shaped space, and wherein at least one local access panel of the inner fairing possesses a size and shape that is substantially the same as the triangular shaped space defined by said at least two of the frame rods.

15. The apparatus of claim 14, wherein the inner fairing includes a plurality of local access panels.

16. The apparatus of claim 14, wherein gearbox accessory is a starter/generator that has a diameter greater than five inches.

17. The apparatus of claim 14, wherein the nacelle panels extend between the front frame and the rear frame, and wherein the ends of the rods are connected to the respective frames by pins.

18. The apparatus of claim 14, wherein at least one of the nacelle panels is movable, and wherein the local access panel is movable.

* * * * *

UNITED STATES PATENT AND TRADEMARK OFFICE
CERTIFICATE OF CORRECTION

PATENT NO.        : 8,438,859 B2                                              Page 1 of 1
APPLICATION NO.   : 12/006980
DATED             : May 14, 2013
INVENTOR(S)       : Vetters It is certified that error appears in the above-identified patent and that said Letters Patent is hereby corrected as shown below:

In the claims,

Column 7, line 23 (Claim 7): remove the word "a" so that the claim reads:

"The apparatus of claim 4, wherein the local access panel can be..."

Signed and Sealed this
Fifteenth Day of December, 2015

Michelle K. Lee
*Director of the United States Patent and Trademark Office*